US007251285B2

(12) United States Patent
Lee et al.

(10) Patent No.: US 7,251,285 B2
(45) Date of Patent: Jul. 31, 2007

(54) METHOD AND APPARATUS FOR TRANSMITTING AND RECEIVING USING TURBO CODE

(75) Inventors: Young Jo Lee, Kyonggi-do (KR); Ki Jun Kim, Seoul (KR); Chan Ho Kyung, Inchon (KR); Young Woo Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 813 days.

(21) Appl. No.: 09/877,199

(22) Filed: Jun. 11, 2001

(65) Prior Publication Data
US 2002/0027956 A1 Mar. 7, 2002

(30) Foreign Application Priority Data
Jul. 11, 2000 (KR) .......................... 10-2000-39521
Dec. 15, 2000 (KR) .......................... 10-2000-76786

(51) Int. Cl.
*H04L 5/12* (2006.01)
*H04L 23/02* (2006.01)

(52) U.S. Cl. ...................... 375/262; 375/347; 375/259; 714/790; 714/774; 714/701; 370/331

(58) Field of Classification Search ................ 375/262, 375/347, 259; 370/331; 714/701, 752–796; 376/331
See application file for complete search history.

(56) References Cited

U.S. PATENT DOCUMENTS 5,907,582 A * 5/1999 Yi ................................ 375/259

| 5,937,015 | A | * | 8/1999 | Dent et al. | .................. 375/341 |
|-----------|---|---|---------|-------------|-----------|
| 5,970,085 | A | * | 10/1999 | Yi | ............................... 370/342 |
| 5,978,365 | A |   | 11/1999 | Yi | ............................... 370/331 |
| 5,983,384 | A |   | 11/1999 | Ross | |
| 6,023,783 | A | * | 2/2000 | Divsalar et al. | ............ 714/792 |
| 6,061,387 | A |   | 5/2000 | Yi | ............................... 375/142 |
| 6,094,427 | A | * | 7/2000 | Yi | ............................... 370/331 |
| 6,166,667 | A | * | 12/2000 | Park | ............................ 341/94 |
| 6,269,129 | B1 | * | 7/2001 | Rhee et al. | ................. 375/341 |

(Continued)

FOREIGN PATENT DOCUMENTS

WO         WO 97/41670         11/1997

OTHER PUBLICATIONS

Fan Mo; Kwatra, S.C.; Junghwan Kim;"Analysis of puncturing pattern for high rate turbo codes", Military Communications Conference Proceedings, 1999. MILCOM 1999. IEEE, vol. 1, Oct. 31-Nov. 3, 1999 pp. 547-550 vol. 1.*

(Continued)

*Primary Examiner*—Jean B. Corrielus
*Assistant Examiner*—Nader Bolourchi
(74) *Attorney, Agent, or Firm*—Lee, Hong, Degerman, Kang & Schmadeka (57) ABSTRACT

A transmitter using constituent encoders to generate turbo-encoded bit sequence having variable bit order from an information bit is provided. Each constituent encoder encodes a bit to a bit sequence and each bit sequence from respective constituent encoder has same error correction performance in decoding. Each encoded bit sequence is punctured using optimal puncturing pattern based on code rate and the resultant sequences have the same error correction performance. A receiver receives each bit sequence and depunctures with an optimal depuncturing pattern to decode bits efficiently.

18 Claims, 5 Drawing Sheets

U.S. PATENT DOCUMENTS

| | | | |
|---|---|---|---|
| 6,334,197 B1 * | 12/2001 | Eroz et al. | 714/701 |
| 6,397,367 B1 * | 5/2002 | Park et al. | 714/786 |
| 6,519,732 B1 * | 2/2003 | Li | 714/755 |
| 6,571,369 B1 * | 5/2003 | Li | 714/792 |
| 6,693,889 B1 * | 2/2004 | Abe et al. | 370/342 |
| 6,704,368 B1 * | 3/2004 | Nefedov | 375/265 |
| 6,751,772 B1 * | 6/2004 | Kim et al. | 714/786 |

OTHER PUBLICATIONS

Wijk Van D J et al, :Fading Correlation and its Effect on the Capacity of Space-Time Turbo Coded DS/SDMA Systems,: Milcom 1999. IEEE Military Communications Conference Proceedings, Atlantic City, NJ, Oct. 31-Nov. 3, 1999, IEEE Military Communications Conference, New York, NY, vol. 1 of 2 Conf. 18, Oct. 13, 1999, XP000921974.

* cited by examiner

METHOD AND APPARATUS FOR TRANSMITTING AND RECEIVING USING TURBO CODE

BACKGROUND OF THE INVENTION

1. Field of the Invention

The present invention relates to the 3rd generation mobile communication system. More particularly, the present invention relates to a communication system and method for turbo encoding and decoding of data

2. Description of the Related Art

Generally, next generation mobile communication systems based on code division multiple access (CDMA) mode support high speed data transmission of Mbps and require very low packet error rate of $10^{-5} \sim 10^{-6}$ unlike voice communication systems. However, there are limits in applying the convolutional coding mode, generally used in existing communication systems, to high speed data transmission. In this respect, a turbo coding mode is widely used to maintain a low packet error rate even under a poor mobile communication environment. It is recent tendency that the turbo coding mode is widely adopted as the standard of a mobile communication system.

Figure 1:
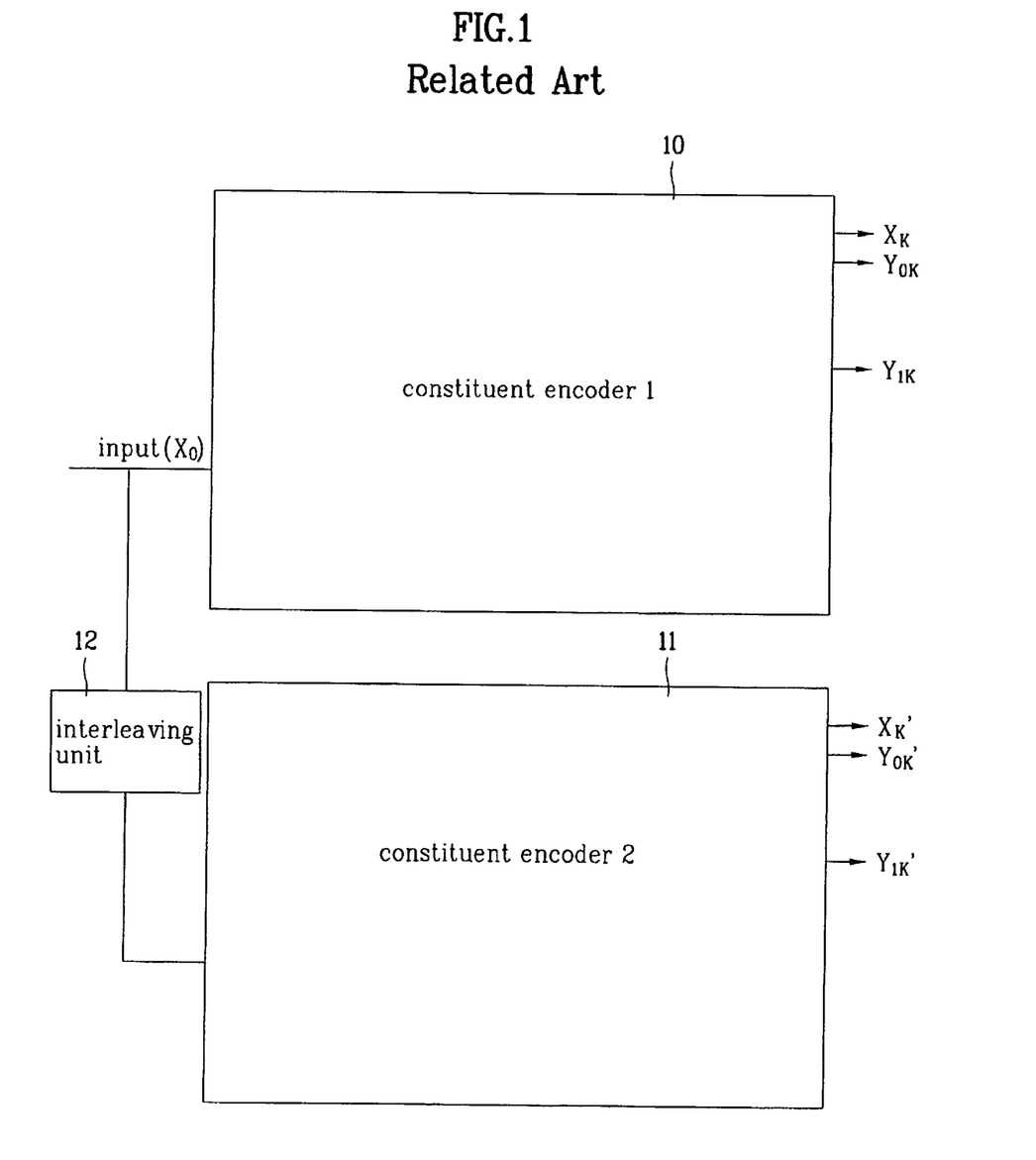
FIG. 1 shows a related art parallel concatenated turbo encoder for generating turbo codes.

FIG. 1 shows a related art parallel concatenated turbo encoder for generating turbo codes. Referring to FIG. 1, a parallel concatenated turbo encoder consists of two identical constituent encoders 10 and 11 connected with each other in parallel and an interleaving unit 12 interposed between them. First parity bits $Y_{0k}$ and $Y_{1k}$ of a information bit $X_k$ are generated from the first constituent encoder 10 while second parity bits $Y_{0k}'$ and $Y_{1k}'$ of an interleaved information bit $X_k'$ are generated from the second constituent encoder 11.

The related art parallel concatenated turbo encoder outputs information bits and parity bits in the order of $X_k$ $Y_{0k}$ $Y_{1k}$ $X_k' Y_{0k}' Y_{1k}'$ and consequently the coding rate of the turbo encoder is ⅙.

Figure 2:
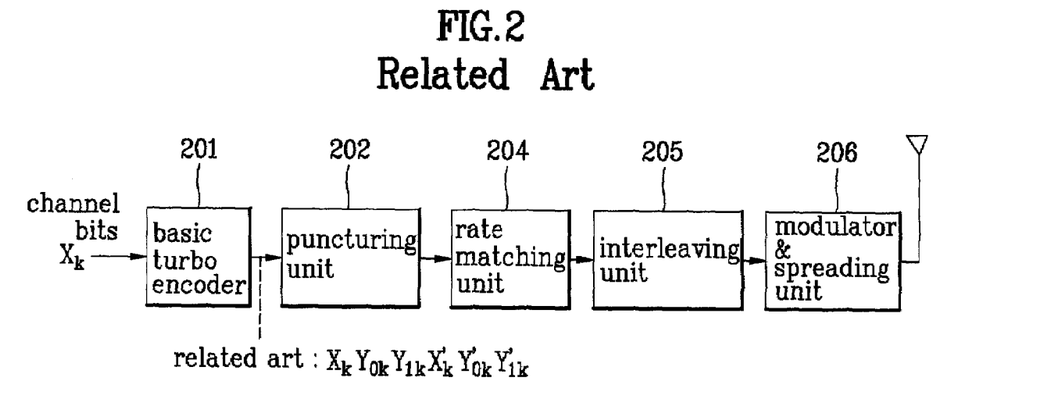
FIG. 2 shows an apparatus for generating a transmission signal based on the related art turbo encoder.

FIG. 2 shows an apparatus for generating a transmission signal based on a related art turbo encoder. Referring to FIG. 2, a basic turbo encoder 201 is provided with the parallel concatenated turbo encoder of FIG. 1. The basic turbo encoder 201 encodes the information bit sequence into an encoded bit sequence whose coding rate is ⅙. A puncturing unit 202 performs puncturing on the encoded bit sequence so that the resulting coding rate can be matched with the required coding rate. The puncturing is performed according to a predetermined puncturing pattern that gives the best performance. A rate matching unit 204 performs symbol repetition or puncturing on the punctured bits sequence to match the encoded bits sequence with the size N of the interleaving unit 205. An interleaving unit 205 interleaves the output bits sequence of the rate matching unit 204 to overcome the burst error characteristic of the channel. A modulator and spreading unit 206 modulates and spreads the interleaved bits sequence.

At this time, the encoded bits sequence from the basic turbo encoder 201 has an output order such as "$X_k$ $Y_{0k}$ $Y_{1k}$ $X_k' Y_{0k}' Y_{1k}'$" punctured with the puncturing pattern determined by the required coding rate. As a result, the transmitted signal from the transmitter based on information bits sequence has one output order.

However, there are cases where differently encoded bit sequences are needed that are generated from the same information bits sequence and have same error correcting capabilities. For instance, if two antenna transmit diversity is applied to the related art, it is better for each antenna to transmit different signals than to transmit the identical signals since additional code combining gain as well as maximal ratio combining gain can be obtained at the receiver.

In the related art, since the basic turbo encoder 201 has the output order such as "$X_k$ $Y_{0k}$ $Y_{1k}$ $X_k' Y_{0k}' Y_{1k}'$", the puncturing unit 202 in the transmitter does not have one puncturing pattern but several puncturing patterns to obtain the encoded bit sequences differently. Further, the punctured bit sequences must have the same error correcting capabilities. It is very difficult to find the puncturing patterns that have the same performance and even if it is found, the transmitter becomes more complex because the change in the puncturing pattern used in the puncturing unit 202 can cause the puncturing pattern of the rate matching unit 204 to change. The transmitter needs to memorize the combinations of puncturing patterns that are used in both the puncturing unit 202 and the rate matching unit 204.

Figure 3:
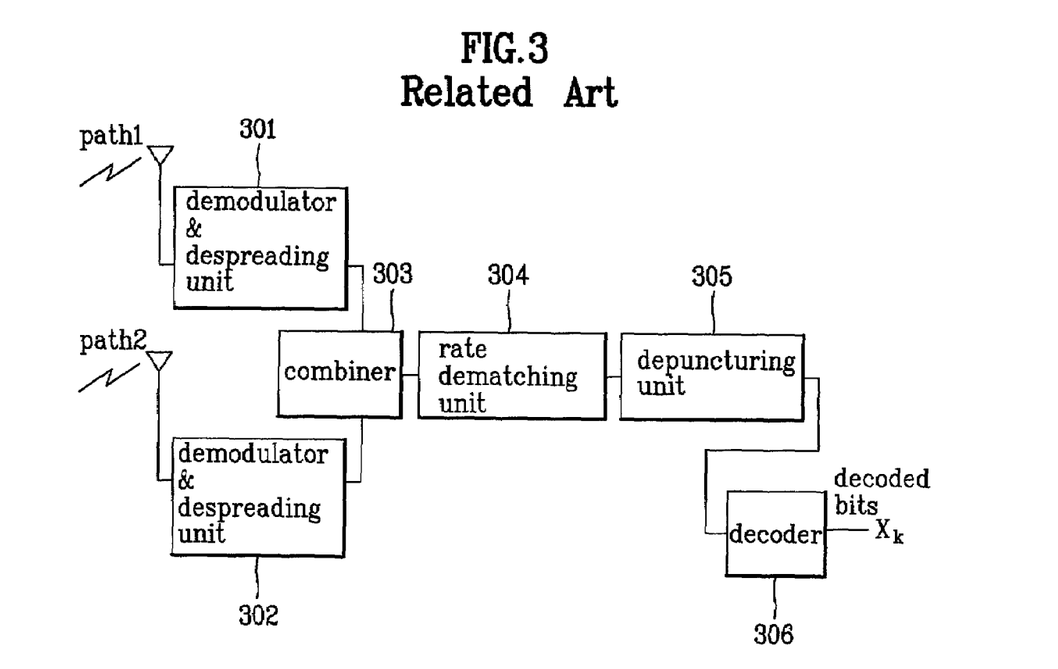
FIG. 3 shows a related art apparatus for decoding a received signal when identical signals are used for transmit diversity.

FIG. 3 shows a related art apparatus for decoding a received signals when identical signals are used for transmission diversity.

Referring to FIG. 3, the two modulated signals transmitted from the transmitter are received by two receiver antenna. Then, the signals are demodulated and despread by a corresponding demodulator and a corresponding despreading unit 301 and 302. The output signals from the demodulator and despreading units 301 and 302 are soft combined with each other by a combiner 303 to get a bit sequence with low error rate. The combined bit sequence is deinterleaved and rate dematched through a rate dematching unit 304 and depunctured through a depuncturing unit 305. The resultant bit sequence is decoded to get the unit 305 originally transmitted information bit sequence $X_k$.

A detailed example is shown in the following to illustrate the idea more definitely.

Two antenna transmit diversity is assumed and the desired coding rate after the puncturing unit 202 is assumed to be ½.

To obtain a desired coding rate from the ⅙ original code rate, the symbol puncturing block punctures the bits according to the puncturing pattern (not shown). In the case that identical signals are transmitted via two antennas, the encoded bit sequence from the turbo encoder 201 is punctured according to the puncturing pattern and the resultant sequence is in the order "$X_k$ $Y_{0k}$ $X_{k+1}$ $Y_{0k+1}$". The punctured sequences are rate matched, interleaved, modulated and transmitted via the two transmit antennas through the noisy channel.

The two signals go through different channel environments and are received at the receiver antenna separately. The combiner 303 combines the power of the demodulated bit sequences from two antenna in the order as they are transmitted, i.e. "$X_k$ $Y_{0k}$ $X_{k+1}$ $Y_{0k+1}$".

In other words, the combiner 303 performs maximal ratio combining on the demodulated bit sequences and the effective coding rate does not change compared with that of the transmitted signal.

In the case that different signals are transmitted via two antenna, the encoded bit sequence from the turbo encoder 201 is punctured by different puncturing patterns that give the same performance. Assuming that puncturing patterns "110000100010" and "100010110000" are found to have same performance, two different signals can be generated from them. Namely, the encoded bit sequence from the turbo encoder 201 is punctured using the different puncturing patterns. The resultant sequences are in the order "$X_k$ $Y_{0k}$ $X_{k+1}$ $Y_{0k+1}$" and "$X_k$ $Y_{0k}' X_{k+1}$ $Y_{0k+1}$". These sequences are rate matched, interleaved, modulated and transmitted via two transmit antenna through the noisy channel. The two signals are received at the receiver, demodulated, despread, deinterleaved, depunctured separately and combined at the combiner. In this case, the combiner should be intelligent enough so that it can perform maximal ratio combining to the systematic bits while performing code combining to the parity bits, i.e. the combined bit sequence is in the order "$X_k$ $Y_{0k}$ $Y_{0k}'X_{k+1}$ $Y_{0k+1}'Y_{0k+1}$". In other words, the combiner performs code combining as well as maximal ratio combining on the received signals and the effective coding rate reduces to 1/3, which enhances the error correcting capability.

Another example can be shown in the case that a hybrid type automatic repeat request (referred to as "H-ARQ") mode is used.

Figure 4:
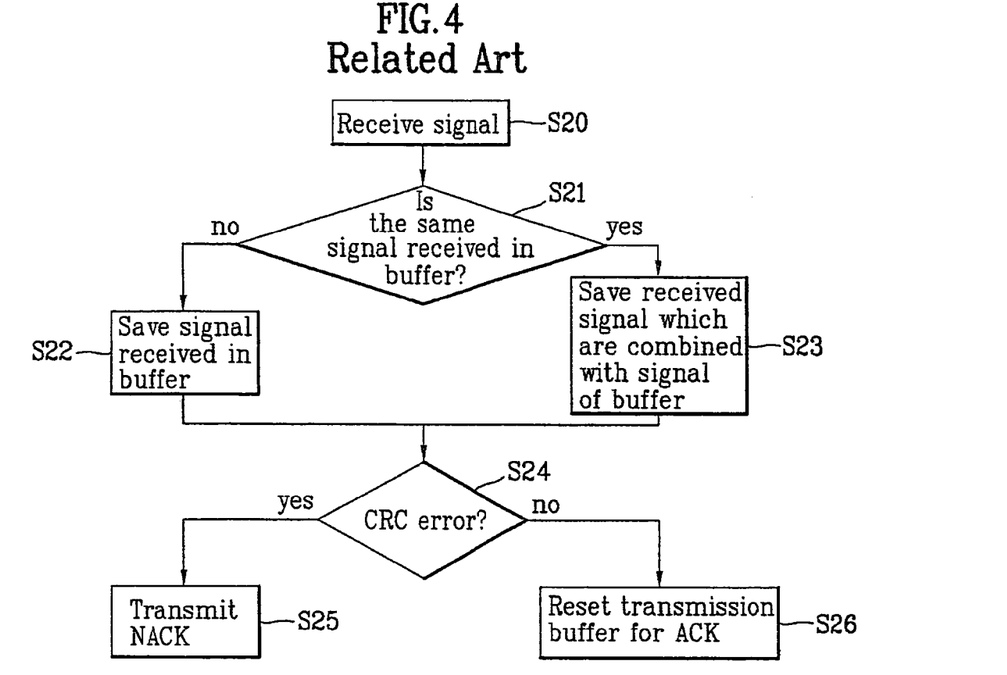
FIG. 4 is a flow chart illustrating a procedure of a related art hybrid type ARQ mode.

FIG. 4 is the flow chart illustrating the procedure of a related art hybrid type ARQ mode.

Referring to FIG. 4, in the related art hybrid type ARQ mode, a transmitter adds a cyclic redundancy check (CRC) code to the information bit sequence, and the information bit sequence to which the CRC is added is encoded to generate a encoded bit sequence. The encoded bit sequence is then punctured, rate matched, interleaved, modulated into a transmission signal and transmitted to the receiver. Then, the receiver receives the signal (S20) and demodulates and decodes the signal. The receiver determines whether the demodulated bit sequence is "New signal" or "Retransmitted signal" by examining if the same bit sequence as the demodulated bit sequence of the receiver exists in a buffer (S21).

If the same bit sequence does not exist in the buffer, the received bit sequence is directly stored in the buffer (S22). If the same bit sequence exists in the buffer, the received bit sequence is combined with the bit sequence in the buffer and then stored in the buffer (S23).

The bit sequence stored in the buffer is checked if there is any error in the received bit sequence by CRC (S24). If no error exists in the received bit sequence, the receiver transmits an acknowledgement (ACK) signal to the transmitter and empties the buffer (S26).

If any error exists in the received bit sequence, the received bit sequence is stored in a buffer, and the receiver transmits a non-ACK(NACK) signal to the transmitter (S25).

Accordingly, if the transmitter has received the ACK signal, the transmitter transmits the next new information data. If the transmitter has received the NACK signal, the transmitter retransmits the previously transmitted information data.

The receiver demodulates the retransmitted signal and combines it with the bit sequence stored in the buffer, so that the received bit sequence is decoded. If no error exists in the combined bit sequence, the receiver transmits the ACK signal to the transmitter. If any error exists in the combined bit sequence, the receiver transmits the NACK signal to the transmitter to request another retransmission of the same data, and at the same time stores the combined bit sequence in the buffer.

At this time, if the retransmitted bit sequence includes the same parity bits as the bit sequence previously transmitted, the combining gain that can be obtained at the receiver is only maximal ratio combining gain in the AWGN (Additive White Gaussian Noise) channel. To get code combining gain as well as maximal ratio combining gain, "Retransmitted bit sequence" must include different parity bits from that of "New bit sequence" and the puncturing unit of the transmitter must have several patterns to generate sequences that include different parity bits.

Getting differently encoded sequences based on a information source is beneficial when the encoded sequences are used in the transmit diversity system. However, the method of getting differently encoded sequences by changing the puncturing patterns of the transmitter can add complexity because both the transmitter and the receiver should use not one puncturing pattern but several puncturing patterns. Besides, it is difficult to find puncturing patterns that have the same performance.

SUMMARY OF THE INVENTION

To solve the above problems, an object of the present invention is to provide a communication system and a method for transmitting a signal in the communication system in which turbo codes having the same performance are generated without increasing complexity. Another object of the present invention is to generate differently encoded sequences without changing the puncturing pattern.

More specifically, it is an object of the invention to generates differently encoded sequences that have the same error correcting performance by changing the output order of the turbo encoder properly.

Other objects, characteristic features and advantages of the present invention will now become apparent with a detailed description of an embodiment made with reference to the accompanying drawings,

BRIEF DESCRIPTION OF THE DRAWINGS

Other objects, characteristic features and advantages of the present invention will now become apparent with a detailed description of an embodiment made with reference to the accompanying drawings, in which.

DETAILED DESCRIPTION OF PREFERRED EMBODIMENTS

The following is a detailed description of a preferred embodiment of the communication system and the method for processing a signal in the communication system according to the present invention with reference to the accompanying drawings.

Supposing that encoded bit sequence of the related art turbo encoder are in the order of $X_k$ $Y_{0k}$ $Y_{1k}$ $X_k'Y_{0k}'Y_{1k}'$, in the present invention, encoded bit sequence of turbo encoder can be in the order of $X_k'Y_{0k}'Y_{1k}'X_k$ $Y_{0k}$ $Y_{1k}$ or $X_k$ $Y_{0k}'Y_{1k}'X_k'Y_{0k}$ $Y_{1k}$ as well as $X_k$ $Y_{0k}$ $Y_{1k}$ $X_k'Y_{0k}'Y_{1k}'$.

Referring to FIG. 1, a parallel concatenated turbo encoder of a turbo code includes two constituent encoders and an interleaving unit interposed between them.

The two constituent encoders are both recursive systematic convolutional encoders and have same performance. The first constituent encoder outputs an input value $X_k$ as it is and at the same time outputs two parity bits $Y_{0k}$ and $Y_{1k}$, and the second constituent encoder outputs $X_k'$ which is the interleaved version of $X_k$ as it is and at the same time outputs two parity bits $Y_{0k}'$ and $Y_{1k}'$. Accordingly, the basic turbo encoder in FIG. 1. outputs bit sequence that has 1/6 coding rate.

To obtain a desired coding rate from the 1/6 original coding rate, symbol puncturing block punctures the bits according to the rule described in table 1. The desired coding rate may be 1/2, 1/3, 1/4 or 1/5.

TABLE 1

| Output | Code Rate | | | |
|---|---|---|---|---|
| | 1/2 | 1/3 | 1/4 | 1/5 |
| X | 11 | 11 | 11 | 11 |
| $Y_0$ | 10 | 11 | 11 | 11 |
| $Y_1$ | 00 | 00 | 10 | 11 |
| X' | 00 | 00 | 00 | 00 |
| $Y'_0$ | 01 | 11 | 01 | 11 |
| $Y'_1$ | 00 | 00 | 11 | 11 |

Note: For each rate, the puncturing table shall be read first from top to bottom and then from left to right.

In table 1., '0' means the bit should be punctured and '1' means that the bit should not be punctured.

Figure 5:
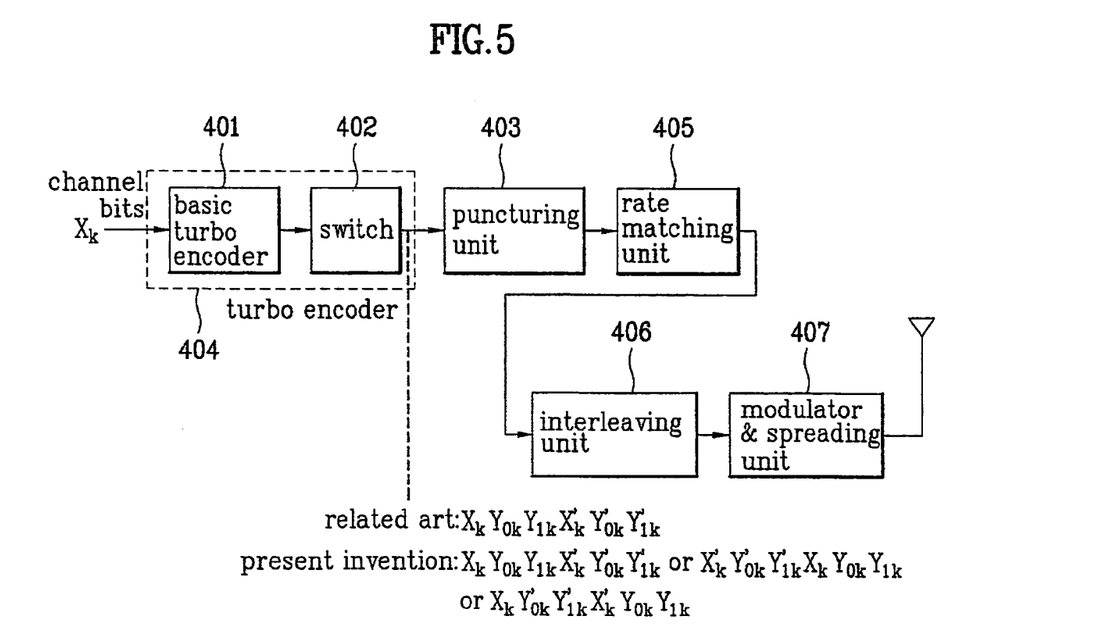
FIG. 5 shows an apparatus for generating a transmission signal based on a turbo encoder according to the present invention.

At this time, in the present invention, if it is necessary for the information bit sequence to be encoded in a different output order, a switch can be used which may be a part of the turbo enconder and decides the output order of encoded bit sequence so that the bit sequences output from respective constituent encoders of a basic turbo encoder 401, as shown in FIG. 5, have different output bit orders, thereby outputting a bits sequence in a desire order. Or the turbo encoder itself should have the ability to output the encoded bit sequence in not only one order but several orders.

FIG. 5 shows an apparatus for generating a transmission signal based on a turbo encoder according to the present invention.

Referring to FIG. 5, the apparatus for generating a transmission signal based on the turbo encoder according to the present invention includes a basic turbo encoder 401, a switch 402, a puncturing unit 403, a rate matching unit 405, an interleaving unit 406, and a modulator & spreading unit 407. The switch 402 decides the output order of encoded bit sequence from the turbo encoder 404. The switch 402 can be omitted if the basic turbo encoder 401 itself can output the encoded bit sequence not only in one fixed output order but in several output orders. At this time, the turbo encoder 404 is defined as a turbo encoder that can output the encoded bit sequence in not only one output order but in several output orders.

Supposing that the output order from the basic turbo encoder 401 is $X_k Y_{0k} Y_{1k} X_k' Y_{0k}' Y_{1k}'$ in the same manner as the related art, the output order of the encoded bit sequence from the turbo encoder 404 may be $X_k' Y_{0k}' Y_{1k}' X_k Y_{0k} Y_{1k}$ or $X_k Y_{0k}' Y_{1k}' X_k' Y_{0k} Y_{1k}$ in the present invention.

Figure 6:
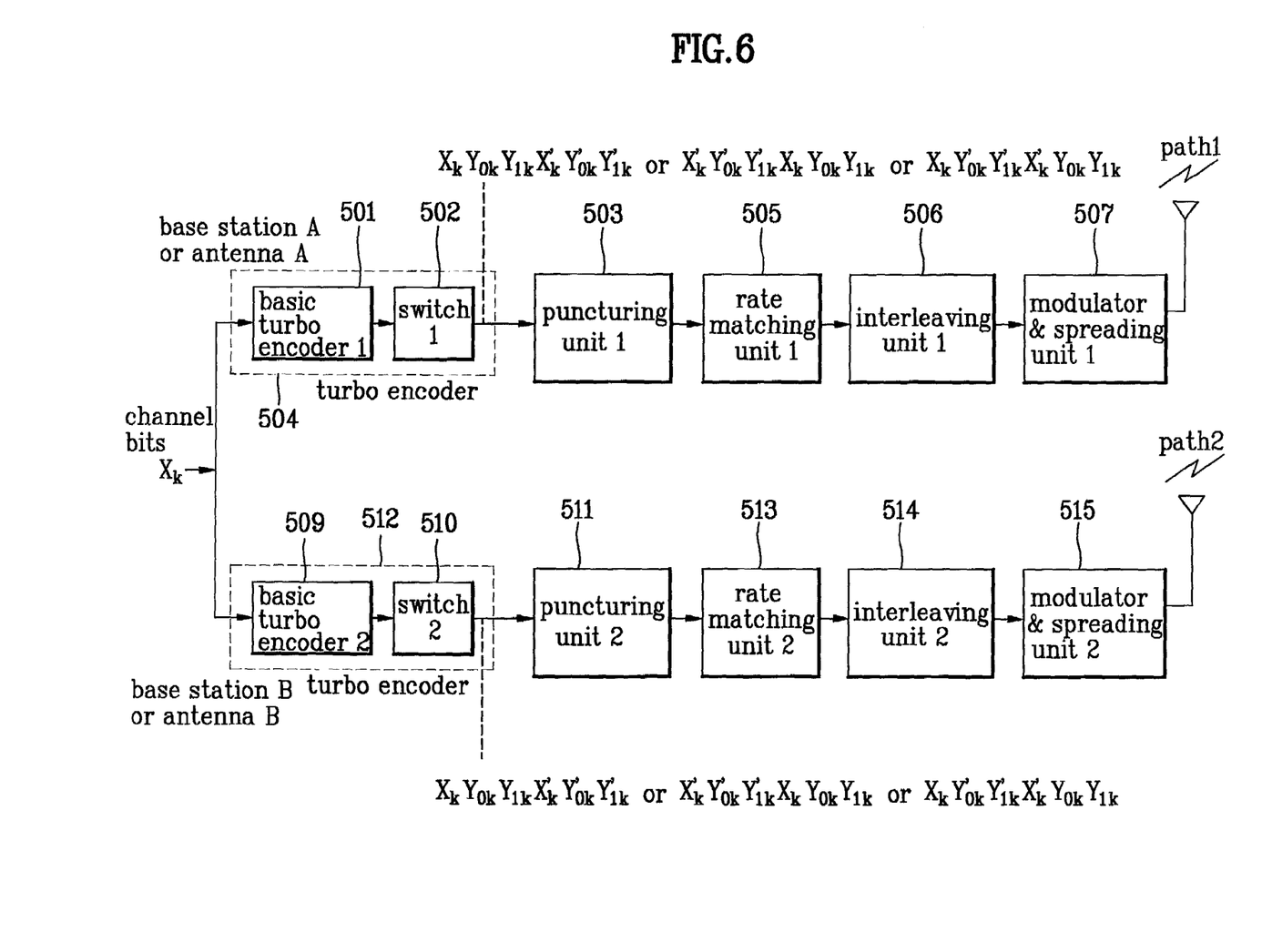
FIG. 6 shows another apparatus for generating a transmission signal based on a turbo encoder according to the present invention.

The encoded bit sequence as mentioned above is punctured to meet a desired coding rate by the puncturing unit 403 according to the puncturing pattern described in table 1. Thereafter, the punctured bit sequence is rate matched, interleaved, spread, and modulated. At this time, the puncturing unit 403 needs to store one puncturing pattern according to the desired coding rate FIG. 6 shows another apparatus for generating a transmission signal according to the present invention when differently encoded bit sequences are used for the transmit diversity.

The encoded bit sequences from the turbo encoder 504, 512 are different from each other and are punctured at the puncturing unit 503, 511 with the same puncturing pattern. The resultant sequences are rate matched, interleaved, modulated and transmitted via different antenna. In the conventional system, the puncturing unit 503 and 511 should have different puncturing patterns to get sequences that have different parity bits, which adds complexity to the system.

Figure 7:
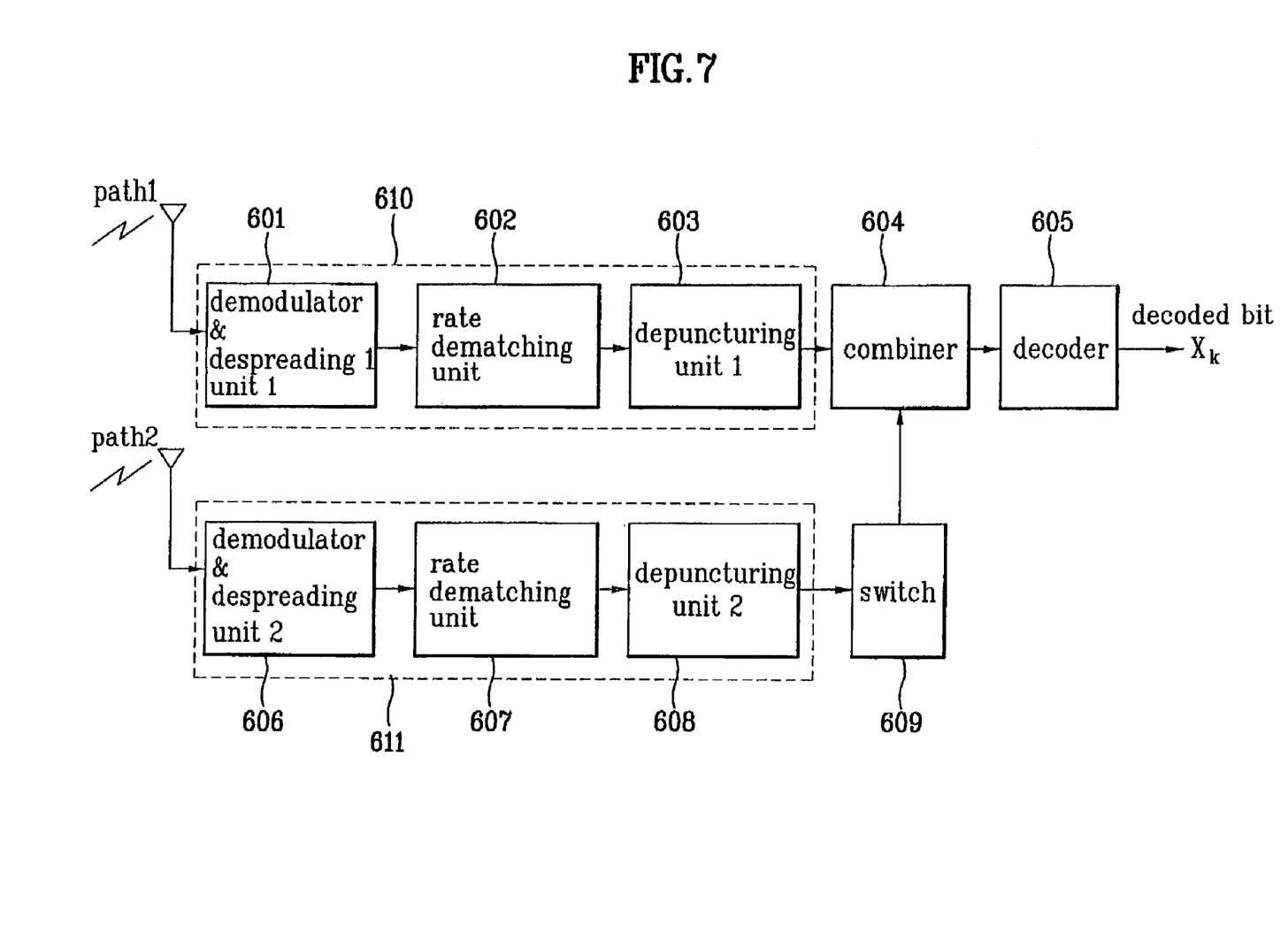
FIG. 7 shows an apparatus for decoding a received signal when different signals are used for transmit diversity.

FIG. 7 shows an apparatus for decoding a received signal when different signals are used for transmit diversity The two transmitted signals are decoded as shown in FIG. 7.

The two different signals are received at the receiver, demodulated, despread, deinterleaved, depunctured separately and combined at the combiner 604. In this case, the combiner should be intelligent enough so that it can perform maximal ratio combining to the systematic bits while performing code combining to the parity bits. Just like the case as the transmitter, the depuncturing unit 603 and 608 use one puncturing pattern in the present invention. But, in the conventional system the depuncturing unit 603 and 608 should use different puncturing patterns since the transmitter uses different puncturing patterns to generate different signals.

A detailed example is shown in the following to illustrate the idea more definitely.

Two antenna transmit diversity is assumed and the desired coding rate after the puncturing unit 503, 511 is assumed to be 1/2.

From Table 1. the puncturing pattern for the coding rate 1/2 can be read as "110000100010" and this pattern is used in both the puncturing unit 503 and 511. If the encoded bit sequence from the turbo encoder 504 is in the order of "$X_k Y_{0k} Y_{1k} X_k' Y_{0k}' Y_{1K}'$", the encoded bit sequence from the turbo encoder 512 should be in a different order, e.g. "$X_k Y_{0k}' Y_{1k}' X_k' Y_{0k} Y_{1k}$". Then, the puncturing unit 503 and 511 puncture the encoded sequences with the same pattern and the resultant sequences become "$X_k Y_{0k} X_{k+1} Y_{0k+1}$" and "$X_k Y_{0k}' X_{k+1} Y_{0k+}'$". The sequences are rate matched, interleaved, modulated and transmitted via different antenna.

The two signals are received at the receiver, demodulated, despread, deinterleaved, depunctured separately and combined at the combiner 604. Unlike the conventional system, the depuncturing units for each signal uses the same depuncturing pattern. The combiner performs maximal ratio combining to the systematic bits while perform code combining to the parity bits, i.e. the combined sequence is in the order "$X_k Y_{0k} Y_{0k}' X_{k+1} Y_{0k+1} Y_{0k+1}'$". In other words, the combiner performs code combining as well as maximal ratio combining on the received signals and the effective coding rate reduces to 1/3, which enhances the error correcting capability.

Another example can be shown in the case that a hybrid type automatic repeat request (referred to as "H-ARQ") mode is used.

Using different signals for the "New" signals and "Retransmitted" signals, additional code combining gain can be obtained. And since one puncturing pattern is used for both the "New" and "Retransmitted" signals, the system adds no complexity.

To illustrate the case hybrid ARQ is used, detailed example is shown in the following. The desired coding rate after the puncturing unit 403 is assumed to be ½.

The transmitter generates signals as in FIG. 5.

The transmitter encodes the "New" bit sequence in the order "$X_k Y_{0k} Y_{1k} X_k'Y_{0k}'Y_{1k}'$" and punctures it according to the puncturing pattern "110000100010". The resultant bit sequence is "$X_k Y_{0k} X_{k+1} Y_{0k+1}'$" and the sequences are rate matched, interleaved, modulated and transmitted to the receiver.

If the receiver sends a "NACK" to the "New" signal, the transmitter then encodes the "Retransmitted" bit sequence in the order "$X_k Y_{0k}'Y_{1k}'X_k'Y_{0k} Y_{1k}$" and punctures it according to the same pattern. The resultant bit sequence is "$X_k Y_{0k}'X_{k+1} Y_{0k+1}'$" and the sequences are rate matched, interleaved, modulated and transmitted to the receiver.

The receiver combines the "Retransmitted" signal with the "New" signal stored in the buffer. Since the two signals are different from each other, code combining gain as well as maximal ratio combining gain can be obtained.

As aforementioned, the communication system and the method for transmitting a signal in the communication system according to the present invention have the following advantages.

It is possible to get differently encoded sequences giving the same performance from one information sequence using the same puncturing pattern by simply changing the output order of the turbo encoder.

In other words, the present invention can generate different signals easily without adding complexity to both the transmitter and receiver. The different signals can be used to enhance the performance of the system when transmit diversity, e.g. two antenna diversity or H-ARQ, is used.

The above description will enable one skilled in the art to modify and revise the invention within the spirit not degrading the technical concept of the present invention. However, the technical scope of the present invention is not limited to the above description of the embodiment but shall be determined by the claims.

What is claimed is:

1. A receiver for receiving signals via at least one transmitting antenna in a communication system, comprising:
   a plurality of depuncturing units adapted to depuncture a first encoded signal and a second encoded signal with the same depuncturing pattern, the first encoded signal encoded differently from the second encoded signal; and
   a combiner for soft combining outputs from the plurality of depuncturing units.

2. The receiver of claim 1, further comprising:
   a plurality of demodulator and despreading units adapted to demodulate and despread the received signals; and
   a plurality of deinterleaver and rate dematching units adapted to deinterleave and dematch the output of the plurality of demodulator and despreading units.

3. The receiver of claim 1, wherein
   a maximal ratio combining method is applied to an information bits part of the outputs of the plurality of depuncturing units; and
   a code combining method is applied to parity bits part of the signals output from the plurality of depuncturing units.

4. A method for receiving a signal in a communication system, comprising:
   receiving a first bit sequence which is turbo encoded from an information bit;
   receiving a second bit sequence which is turbo encoded differently from the information bit;
   depuncturing the first bit sequence and the second bit sequence using the same depuncturing pattern based on a coding rate; and
   combining the first depunctured bit sequence and the second depunctured bit sequence.

5. The method of claim 4, further comprising decoding the combined bit sequence using a decoding algorithm.

6. The method of claim 4, wherein the first bit sequence and the second sequence are transmitted by separate transmitters.

7. The method of claim 4, wherein the first bit sequence and the second sequence are transmitted by separate antennas.

8. The method of claim 4, wherein the first bit sequence and the second bit sequence have the same error correction performance.

9. A method for encoding input bits comprising:
   providing input bits to first and second encoders;
   encoding each of the input bits by the first encoder to provide first coded bits, wherein the first coded bits comprise one of $XY_0Y_1X'Y'_0Y'_1$, $X'Y'_0Y'_1XY_0Y_1$ and $X\,Y'_0Y'_1X'Y_0Y_1$;
   encoding each of the input bits by the second encoder to provide second coded bits, wherein the second coded bits comprise one of $XY_0Y_1X'Y'_0Y'_1$, $X'Y'_0Y'_1XY_0Y_1$ and $XY'_0Y'_1X'Y_0Y_1$, wherein the first coded bits and the second coded bits are encoded differently; and
   providing the first and second coded bits for puncturing to form output coded bits such that the first and second coded bits are punctured using the same puncturing pattern,
   wherein the X or X' bit of first coded bits and X or X' bit of the second coded bits are provided for puncturing and the output coded bits include one of X and X'.

10. The method of claim 9, wherein for ½ code rate, the same puncturing pattern comprises:

| | |
|---|---|
| 1 | 1 |
| 1 | 0 |
| 0 | 0 |
| 0 | 0 |
| 0 | 1 |
| 0 | 0 | wherein "0" indicates a corresponding coded bit of first and second coded bits is to be punctured, and "1" indicates a corresponding coded bit of the first and second coded bits is to be not punctured, and
wherein a first column in the above table corresponds to a puncturing pattern for the first and second coded bits based on an even index bit of the input bits, and a second column in the above table corresponds to a puncturing pattern for the first and second coded bits based on an odd index bit of the input bits.

11. The method of claim 10, wherein when the first coded bits comprises $XY_0Y_1X'Y'_0Y'_1$ and the second coded bits comprises $XY'_0Y'_1X'Y_0Y_1$, the output coded bits after puncturing comprise $XY_0$ and $XY'_0$ for even index bit of the input bits, and the output coded bits after puncturing comprise $XY'_0$ and $XY_0$ for odd index bit of the input bits.

12. The method of claim 9, wherein for ⅓ code rate, the same puncturing pattern comprises:

| | |
|---|---|
| 1 | 1 |
| 1 | 1 |
| 0 | 0 |
| 0 | 0 |
| 1 | 1 |
| 0 | 0 | wherein "0" indicates a corresponding coded bit of first and second coded bits is to be punctured, and "1" indicates a corresponding coded bit of the first and second coded bits is to be not punctured, and wherein a first column in the above table corresponds to a puncturing pattern for the first and second coded bits based on an even index bit of the input bits, and a second column in the above table corresponds to a puncturing pattern for the first and second coded bits based on an odd index bit of the input bits.

13. The method of claim 12, wherein when the first coded bits comprises $XY_0Y_1X'Y'_0Y'_1$ and the second coded bits comprises $XY'_0Y'_1X'Y_0Y_1$, the output coded bits after puncturing comprise $XY_0Y'_0$ and $XY'_0Y_0$ for even index bit and odd index bit of the input bits.

14. The method of claim 9, wherein for ¼ code rate, the same puncturing pattern comprises:

| | |
|---|---|
| 1 | 1 |
| 1 | 1 |
| 1 | 0 |
| 0 | 0 |
| 0 | 1 |
| 1 | 1 | wherein "0" indicates a corresponding coded bit of first and second coded bits is to be punctured, and "1" indicates a corresponding coded bit of the first and second coded bits is to be not punctured, and wherein a first column in the above table corresponds to a puncturing pattern for the first and second coded bits based on an even index bit of the input bits, and a second column in the above table corresponds to a puncturing pattern for the first and second coded bits based on an odd index bit of the input bits.

15. The method of claim 14, wherein when the first coded bits comprises $XY_0Y_1X'Y'_0Y'_1$ and the second coded bits comprises $XY'_0Y'_1X'Y_0Y'_1$, the output coded bits after puncturing comprise $XY_0Y_1Y'_1$ and $XY'_0Y'_1Y_1$ for even index bit of the input bits, and the output coded bits after puncturing comprise $XY_0Y'_0Y'_1$ and $XY'_0Y_0Y_1$ for odd index bit of the input bits.

16. The method of claim 9, wherein for ⅕ code rate, the same puncturing pattern comprises:

| | |
|---|---|
| 1 | 1 |
| 1 | 1 |
| 1 | 1 |
| 0 | 0 |
| 1 | 1 |
| 1 | 1 | wherein "0" indicates a corresponding coded bit of first and second coded bits is to be punctured, and "1" indicates a corresponding coded bit of the first and second coded bits is to be not punctured, and wherein a first column in the above table corresponds to a puncturing pattern for the first and second coded bits based on an even index bit of the input bits, and a second column in the above table corresponds to a puncturing pattern for the first and second coded bits based on an odd index bit of the input bits.

17. The method of claim 16, wherein when the first coded bits comprises $XY_0Y_1X'Y'_0Y'_1$ and the second coded bits comprises $X Y'_0Y'_1X'Y_0Y_1$, the output coded bits after puncturing comprise $XY_0Y_1Y'_0Y'_1$ and $XY_0Y_1Y'_0$ for even index bit and odd index bit of the input bits.

18. The method of claim 9, wherein one of $XY_0Y_1X'Y'_0Y'_1$, $X'Y'_0Y'_1XY_0Y_1$ and $XY'_0Y'_1X'Y_0Y_1$ is selected using at least one switch.

* * * * *